Dec. 12, 1933.  L. F. NENNINGER ET AL  1,938,775
MILLING MACHINE
Filed Dec. 10, 1929    3 Sheets-Sheet 1

Inventor
LESTER F. NENNINGER
WALTER D. ARCHEA
By A. K. Parsons
Attorney

Dec. 12, 1933.  L. F. NENNINGER ET AL  1,938,775
MILLING MACHINE
Filed Dec. 10, 1929   3 Sheets-Sheet 2
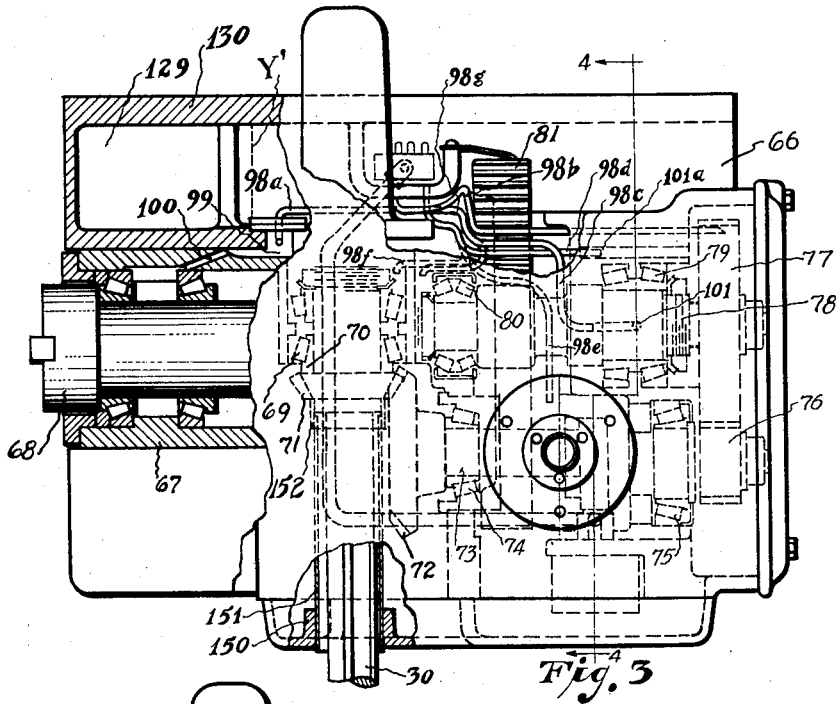
Fig. 3
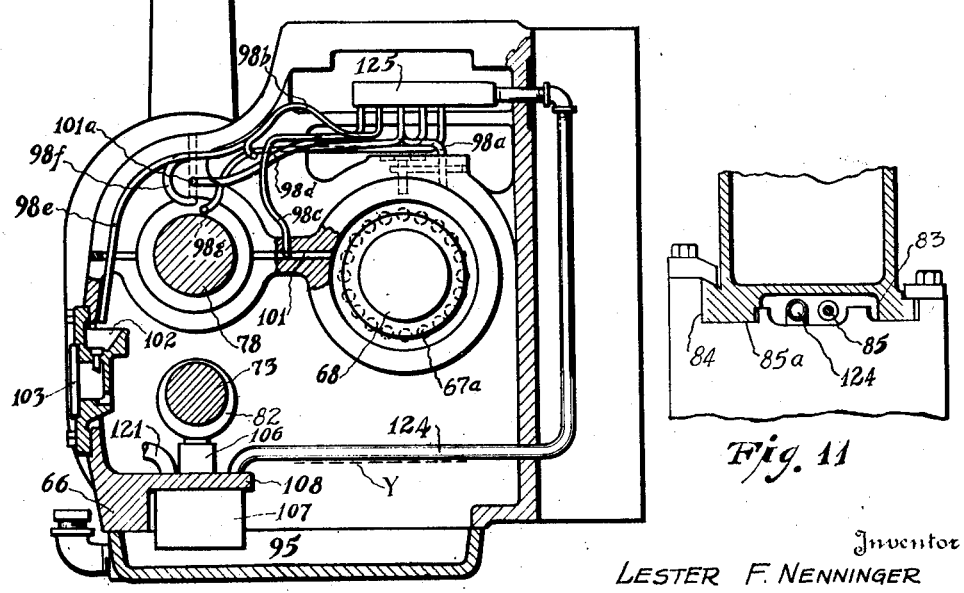
Fig. 4
Fig. 11
Inventor
LESTER F. NENNINGER
WALTER D. ARCHEA
By H. K. Parsons
Attorney

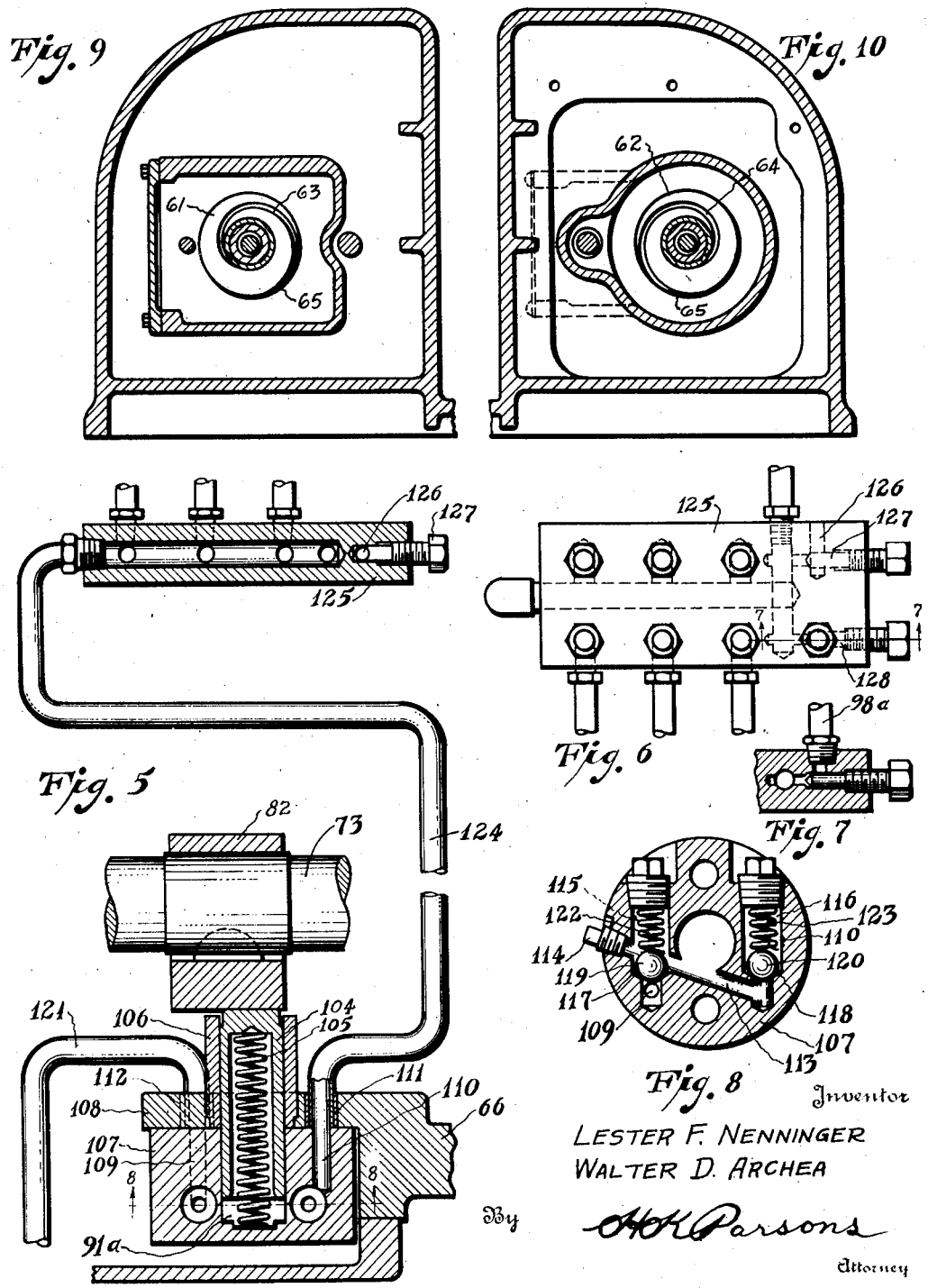

Patented Dec. 12, 1933

1,938,775

UNITED STATES PATENT OFFICE 1,938,775

MILLING MACHINE

Lester F. Nenninger, Cincinnati, and Walter D. Archea, Norwood, Ohio, assignors to The Cincinnati Milling Machine Company, Cincinnati, Ohio, a corporation of Ohio Application December 10, 1929
Serial No. 413,120

4 Claims. (Cl. 184—6)

This invention relates to improvements in machine tools and especially to machines having a plurality of units which cooperate with one another to obtain a given result.

The principal object of this invention is the provision of a machine tool having a plurality of unit, each unit of which comprises its own self-contained lubricating mechanism as distinguished from a structure in which a single lubricating mechanism is employed for lubricating the bearings of all units.

Another object of the invention is to provide a machine tool having a unit or units which may be used in various positions relative to the structure, having a self-contained lubricating mechanism to properly lubricate the bearings therein irrespective of its position.

A further and more specific object of this invention is to provide, for instance, a spindle carrier or head capable of being utilized, for instance, in a horizontal plane, a vertical plane, upside down, or in any other position, without materially altering the lubricating mechanism thereof.

Other objects and advantages of the invention should be readily apparent from the following specification, considered in conjunction with the accompanying drawings forming a part thereof, and it is to be understood that any modifications may be made in the specific structural details herein shown and described, within the scope of the appended claims, without departing from or exceeding the spirit of the invention.

In the drawings:

Figure 3 is an elevational view of a spindle carrier or the like, parts being broken away to more clearly illustrate the construction;

Figure 4 is a sectional view taken on line 4—4 of Figure 3;

Figure 5 is an enlarged development of the lubricating mechanism forming a detail of the invention, parts thereof being sectioned to more clearly illustrate same;

Figure 6 is an enlarged top plan view of a distributor forming a detail of the invention;

Figure 7 is a sectional view on line 7—7 of Figure 6;

Figure 8 is a sectional view on line 8—8 of Figure 5;

Figure 9 is a sectional view taken on line 9—9 of Figure 2;

Figure 10 is a sectional view taken on line 10—10 of Figure 2; and

Figure 11 is a fragmentary sectional view taken on line 11—11 of Figure 1.

Throughout the various views of the drawings, similar reference characters are employed to denote the same or similar parts.

Figure 1:
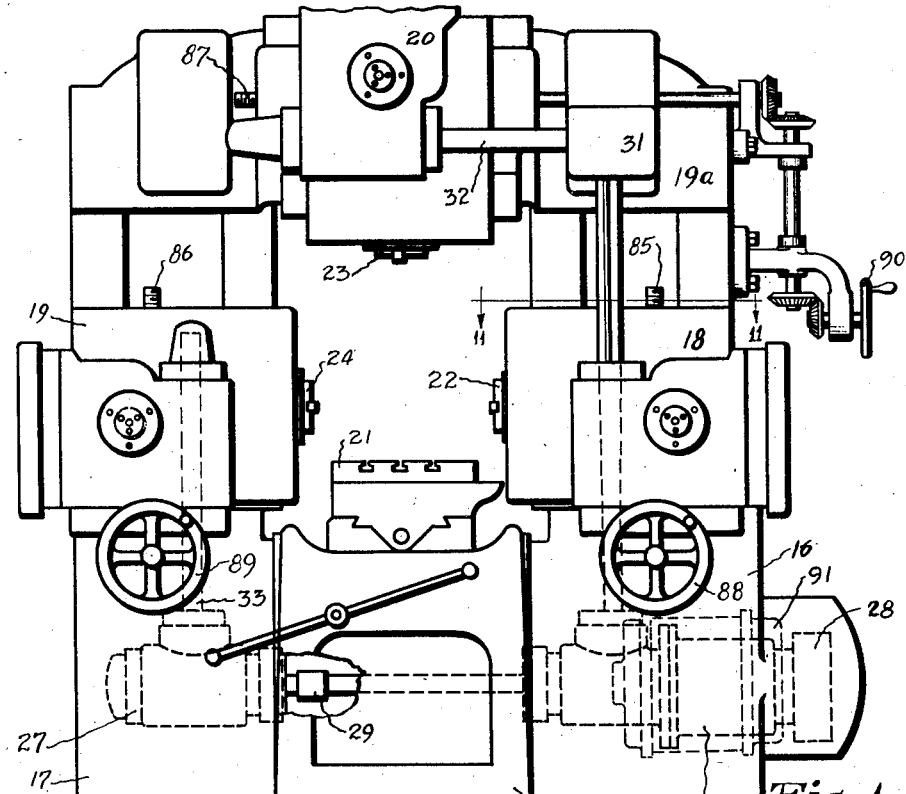
Figure 1 is an elevational view of a machine tool embodying the improvements of this invention.
Figure 2:
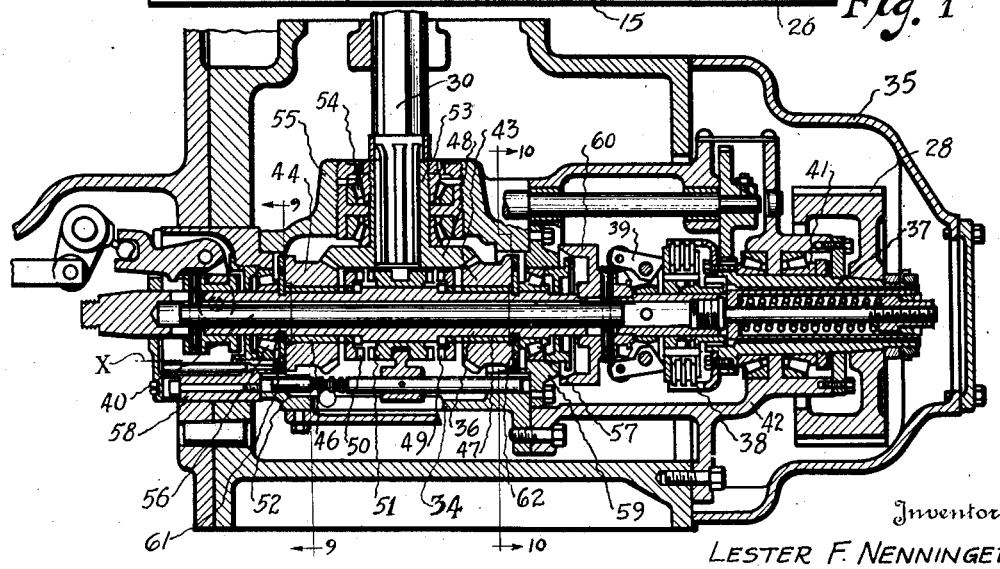
Figure 2 is a longitudinal sectional view through the driving mechanism therefor.

In general, the device illustrated in the drawings comprises a bed 15 having secured thereto and rising on each side thereof, columns 16 and 17 which carry spindle carriers 18 and 19 respectively. Supported by the columns 16 and 17 and extending across the bed 15 is a rail 19a, likewise supporting a spindle carrier 20. The bed 15 carries, for translation thereby by any known or approved means, a table 21 supporting a work piece relative to the spindles 22, 23 and 24 of spindle carriers 18, 19 and 20 respectively. Each of these spindle carriers represent an individual unit co-operating one with the other to simultaneously finish, for instance, three surfaces of a work piece that may be supported by the table 21.

The columns 16 and 17 and the rail 19a are each provided with a similar guide 83 interfitting with guideways 84 formed in the surface or wall 85a of the carriers 18, 19 and 20 adjacent to the said columns and rail. These guides and guideways are exact duplicates of one another, so that the same carrier may be used in any position, whether on the righthand column 16, lefthand column 17 or rail 19a. Any desired translating mechanism may be employed for translating the carriers relative to their supports and, as shown herein, comprises screws 85, 86 and 87 operable as by hand wheels 88, 89 and 90 respectively, for translating the carriers 18, 19 and 20.

To effect rotation of the spindles 22, 23 and 24, gear boxes 26 and 27 are employed, each being mounted within the base portion of one of the columns 16 and 17 and being simultaneously driven by a prime mover or the like 91, delivering power to the main drive pulley or gear 28 and coupled together by coupling 29. The gear box 26 drives the shaft 30, for effecting the rotation of the spindle 22, which shaft 30 is coupled through the mechanism contained in gear box 31 carried by the rail 19, for driving shaft 32 coupled with the spindle 23. A similar shaft 33 extends from the gear box 27, for effecting the rotation of spindle 24. Shafts 30, 32 and 33 are provided with splines or keys, so that the spindles of the carrers 18, 19 and 20 are driven in any of their adjusted positions.

Gear boxes 26 and 27, being duplicates of one another, it is deemed sufficient if a specific description of but one of them be given. The gear box 26 consists of a casing 34 inserted through an opening in the column 16, which opening is closed by a cap 35. Interiorly of the casing 34 is a main drive shaft 36 coupled with the hub or shaft 37 of drive pulley 28 by a friction disk clutch 38. Suitable means, such as clutch fingers 39 operable by shift rod 40, may be utilized for operatively connecting the drive shaft 37 with driven shaft 36. Shaft or hub 37 is journaled in anti-friction bearings 41 supported by housing 42 interiorly of the cap 35 and secured to the end wall of the casing 34 and forming an oil tight joint. Intermediate the ends of the shaft 36, a pair of bevel gears 43 and 44 are loosely journaled, being provided interiorly thereof with bushings 46 and 47. A bevel gear 48, secured to drive shaft 30, meshes with the bevel gears 43 and 44 so as to be rotated thereby when either of the gears 43 or 44 are secured to the shaft 36 for rotation therewith. To effect this drive, gears 43 and 44 are respectively provided with clutch teeth 49 and 50 adapted to engage similar clutch teeth formed on opposite ends of sliding clutch 51 shifted by shift rod 52 from the exterior of the column 16. Gear 48 is provided with a hub 53 journaled in anti-friction bearings 54 carried by a boss 55 integral with and extending from the casing 34. Driven shaft 36 is likewise journaled at its opposite ends in antifriction bearings 56 and 57 carried by bushings or sleeves 58 and 59 suitably secured to the casing 34.

The casing 34 contains a suitable oil or lubricant medium in an amount which extends substantially to a level indicated by the line X. This lubricant level is just below the bearings of the main drive shaft 37 and driven shaft 36 but is above the lowermost edge of rotating gears 43 and 44, brake 60 and friction clutch 38, so that, as these members rotate, oil is picked up and splashed or distributed through the entire interior of casing 34 and is collected by the various anti-friction bearings and other bearings in which the rotating shafts and the like are journaled.

To properly effect the lubrication of the bearings between the driven shaft 36 and bushings 46 and 47 and between these bushings and their respective beveled gears 43 and 44, oil rings 61 and 62 are employed. These rings, as shown in Figures 9 and 10 are each provided with helical or spiral grooves 63 and 64 extending from the outer periphery to the bore thereof. As these washers are rotated, the outer end 65 of the grooves dip into the oil, picking up a certain amount, which flows down through the grooves to the bearings above mentioned.

From the foregoing, it will be noted that each of the gear boxes 26 and 27 have their bearings properly lubricated by the splash oil system, which is self-contained and distributes no lubricant to any other part of the machine.

Spindle carriers 18, 19 and 20 are duplicates of one another and it is deemed sufficient if but one of them be described. Spindle carrier 18 comprises a sealed casing 66 having bearings 67 and 67a for the main spindle 68. The casing 66 also contains the bearings 69 in which the hub 70 of driving bevel gear 71 is journaled. The hub 70 is provided interiorly with suitable keyways, for engagement with the splines of main drive shaft 30 and is driven thereby. Meshing with bevel pinion 71 is bevel gear 72 integral with driven shaft 73 journaled in anti-friction bearings 74 and 75 carried by the casing or housing 66. Driven shaft 73 has mounted on its rear end a pinion 76 meshing with a gear 77 on the end of intermediate shaft 78. Shaft 78 is likewise journaled in anti-friction bearings 79 and 80 and bears a pinion meshing with a driving or bull gear 81 splined on the spindle 68. To properly lubricate the various bearings of the spindle carrier above referred to, the shaft 73 has secured, intermediate its ends, an eccentric or cam 82 adapted to actuate in one direction a plunger 104 against the yielding resistance of spring 105 which seats in a counterbore 91a formed in the pump body 107. Plunger 104 is enclosed within a sleeve 106 extending upwardly from the said pump body 107 which is secured to the under surface of a ledge or boss 108 integral with the walls of spindle carrier housing 66 by any suitable means. Ports 109 and 110 are formed in the body 107 and are adapted to register with openings 111 and 112. A cross port 113 extends through the pump body 107, is closed on one end by plug 114 and connects ports 109 and 110. Counterbores 115 and 116 are also formed in the pump body 107 transversely thereof and extend into the cross port 113 and are respectively provided with valve seats 117 and 118 for ball valves 119 and 120. A suction pipe 121 having one end extending into a reservoir 95 and the other end secured in the bore 112 of lug 108 communicating with intake port 109 so that, as the plunger 104 is moved vertically, check valve 119 is lifted from its seat against the yielding resistance of spring 122 contained within bore 115. Continued rotation of cam 82, again downwardly actuates the plunger 104 trapping the lubricant in the port 113 and forcing same out through port 110 by raising valve 120 against the resistance of its spring 123. The lubricant then passes through conductor 124 to a closed distributor 125, from which the oil lines 98 distributes the lubricant. In this connection, it will be noted that seven or more oil lines or leads may be taken off from the distributor 125 for properly lubricating the various bearings. For instance, line or pipe 98a extends from the distributor 125 to a cavity or port 99 formed in the housing 66, from which another port 100 extends to one of the bearings 67 of the spindle 68. Line 98b extends to the extreme rear position of the housing 66 and spills its oil over the face of gears 76 and 77, which oil is in part collected on the face of said gears adjacent their supporting shafts and trickles down to the front bearings 75 of the driven shaft 73 for lubricating same. Line or lead 98c extends to a port 101 to be directed to the other spindle bearing 67a. Line or lead 98d extends to a port 101a which directs the lubricant to the rear bearing of intermediate shaft 78, while line 98e extends down to a trough 102 immediately to the rear of sight glass 103, so that a continuous stream or drip of oil, past said glass, may be visible to the operator to keep him appraised of the lubricating system's operation. Line 98f extends to the bearing 69 of the driving gear 71, through which bearing the lubricant passes to be collected on the rear of said gear 71 and passed to the rear of gear 72, which directs the lubricant into the bearing 74 of driven shaft 73, while line 98g extends to and properly lubricates the forward bearing of the intermediate shaft 78.

To prevent escape of lubricant from the interior of the housing 66, through the opening therein through which the drive shaft 30 extends, a boss 150 is formed therearound to receive a guard sleeve 151 driven into the bore in said boss 150 and surrounding the said drive shaft 30. This sleeve 151 extends upwardly and is received at its upper end within a skirt 152 formed on and depending from drive gear 71. From this, it will be apparent that any lubricant draining from the bearings 69 of gear 71 will pass down the outer surface of sleeve 151 and be wiped off or collected by the lower wall of the housing, and returned to the sump.

By this construction, the lubricant within the distributor 125 and tubes or leads 98 is always under pressure, and to control this pressure, the distributor is provided with a bypass controlled by a valve 127. In addition, the distributor is provided with a valve 128 controlling the flow of lubricant through the distributor tube 98a leading to the spindle bearing 67.

Spindle carriers 18, 19 and 20 are adapted to be utilized in either of the positions indicated in the drawings, and the interior or working mechanism remains substantially the same, so that the units are interchangeable. With this invention, by the method above described, it is only necessary to change the direction of extent or adjust intake pipe 121 so that its receiving end is in the reservoir, for drawing the lubricant to the pump, where it will be discharged to the distributor, no matter in what position the distributor may be relative to the working ports. Likewise, the lubricant being under pressure and forced from the distributor tubes 98, will properly lubricate the bearings no matter in what position they are located.

To this end, the spindle carrier housing 66 is provided with a sump or reservoir 129 adjacent and surrounding the spindle bearing 67, into which the end of intake or suction line 121 is inserted when the unit is mounted on the rail 19a in the position of spindle carrier 20. At this time, the lubricant would extend to a level indicated by the line Y'. When the carrier has been turned completely over, to be used on the lefthand column 17 in the position of carrier 19, the sump or reservoir is formed along the inner surface of the top wall 130 of the housing 66 and includes the adjacent portion of sump or reservoir 129 as a part thereof. From this, it should be evident that if the end of intake or suction pipe or line 121 were placed in the lower left-hand corner of the housing 66 when it is in the position of carrier 20, it need not be changed when the said carrier were used in the position of carrier 19. Also, since the adjacent corners of sumps or reservoirs 95 and 129 are common to one another, the said intake end of suction line 121 may be placed in the lower righthand corner of the housing 66 when the carier is in the position of carrier 20 and need not be changed or altered when the carrier is used in the position indicated by carrier 18.

After the lubricant has passed through the bearings, it is returned by gravity to the reservoir or sump, where it is mixed with the remaining lubricant for redistribution through the system.

From the foregoing description, it should be apparent that there has been devised a machine tool structure utilizing a plurality of independent units co-operating one with the other to form a unitary structure and each unit comprising a plurality of bearings to be properly lubricated. It will also be noted that each of these units contains its own lubricating system independent of the other units, and that no unit is dependent upon another unit for its proper lubrication, nor upon a central lubricating plant. It will also be apparent that an improved lubricating mechanism has been provided for units capable of being used in various positions, such as horizontal, vertical, upside down or in any other position, and still have its bearings properly lubricated.

What is claimed is:

1. In a spindle carrier adapted for attachment to various guides of a machine tool, some of which extend horizontal and some vertical, said carrier including a housing having complementary guideways formed thereon for engagement with said guides, a cutter spindle journaled in the housing, and transmission mechanism carried by the housing for rotating said spindle, the combination of means individual to the carrier unit for lubricating said mechanism regardless of the angular position of the carrier including a fixed header, lubricant delivery channels extending from the header to the various bearings, a pump within the carrier housing and driven by the contained transmission for maintaining a lubricant under pressure in the header, a plurality of potential reservoirs formed in the housing, one for each angular position thereof, said pump having an intake selectively positionable to withdraw lubricant from the reservoir made effective by the position of the carrier.

2. In a machine tool having a plurality of carrier receiving guideways thereon, some of which extend horizontal and others vertical relative to a work support, the combination of a carrier unit, including a cutter spindle journaled therein, selectively attachable to any of said guideways with the spindle at right angles to the guideway, said unit containing a transmission for rotating the spindle at different rates, and means selfcontained in the unit for lubricating said mechanism regardless of the position of the unit as determined by said guideways including a header fixed in the unit, a plurality of delivery channels extending from the header to the various parts of said mechanism to effect lubricating thereof, a pump contained within the carrier, and operated by the transmission thereof for maintaining lubricant under a predetermined pressure in the header whereby lubricant will be positively delivered through said channels regardless of the direction in which they extend, said housing containing a chamber in which lubricant will be reservoired as by gravity in various parts thereof in accordance with the position of the carrier, and a pump intake adapted to be positioned to withdraw lubricant from any reservoir so established by the position of the carrier.

3. In a spindle carrier having a single guideway formed therein for attachment to various complementary guides of a machine tool, some of which extend vertically at opposite sides of a work support, and others horizontally over the work support, said guides having a power driven member extending parallel thereto, a cutter spindle journaled in the carrier and mechanism in the carrier for coupling said member to the spindle for rotation thereby, the combination of means for lubricating said mechanism in any position of the carrier as determined by said guides comprising a header fixed in the carrier, fixed lubricant delivery channels extending from the header to the various bearings of said mechanism, a pump for supplying lubricant to the header under pressure whereby the same will be positively delivered to the various bearings, said pump having a selectively positionable intake, a chamber in the housing in which a plurality of lubricant reservoirs may form as by gravity dependent upon the position of the carrier, and means to position the pump intake in the reservoir as determined by the position of the carrier.

4. In a spindle carrier having a cutter spindle journaled therein and adapted for attachment to various guides of a machine tool and others horizontally over the work support in such manner that the tool receiving end of the spindle is presented to the work support of the machine, said guides having a power driven member extending parallel thereto, and mechanism in the carrier for coupling said member to the spindle for rotation thereby, the combination of means for lubricating said mechanism in any position of the carrier comprising a header fixed in the carrier, fixed lubricating channels extending from the header to the various bearings, a sight glass formed in the wall of the housing, an additional channel extending from the header to the sight glass whereby the operator may observe the lubricant flow, a pump for supplying lubricant to the header under pressure whereby the same will be positively delivered to the various bearings, said pump having a selectively positionable intake, a chamber in the housing in which a plurality of reservoirs may be formed dependent upon the position of the carrier, and means to position the pump intake in the reservoir as determined by the position of the carrier.

LESTER F. NENNINGER.
WALTER D. ARCHEA.